(12) United States Patent
Chen

(10) Patent No.: US 6,711,825 B2
(45) Date of Patent: Mar. 30, 2004

(54) SAW BLADE SECURING DEVICE

(76) Inventor: Chin-Hui Chen, 11F-2, No. 43, Chai-I Street, Taichung City (TW)

( * ) Notice: Subject to any disclaimer, the term of this patent is extended or adjusted under 35 U.S.C. 154(b) by 0 days.

(21) Appl. No.: 10/161,990

(22) Filed: Jun. 6, 2002

(65) Prior Publication Data

US 2003/0226265 A1 Dec. 11, 2003

(51) Int. Cl.$^7$ ................................. B27B 21/00
(52) U.S. Cl. .................... 30/507; 30/523; 83/699.21
(58) Field of Search .................. 30/507, 513, 509, 30/510, 517, 523, 522, 524, 342, 508, 511, 512, 337; 83/699.21; 403/322.2, 322.1, 321, 240, 211, 374.1

(56) References Cited

U.S. PATENT DOCUMENTS

| | | | | | |
|---|---|---|---|---|---|
| 854,517 A | * | 5/1907 | McCain | ........................ | 30/523 |
| 2,185,782 A | * | 1/1940 | Brittin | ........................ | 24/457 |
| 3,447,580 A | * | 6/1969 | Keymer | ........................ | 30/517 |
| 3,542,097 A | * | 11/1970 | Dudek | ........................ | 30/392 |
| 3,756,298 A | * | 9/1973 | West | ........................ | 30/507 |
| 4,294,013 A | * | 10/1981 | Krieg | ........................ | 30/392 |
| 4,651,425 A | * | 3/1987 | Livian | ........................ | 30/507 |
| 4,827,619 A | * | 5/1989 | Alm | ........................ | 30/507 |
| 5,363,733 A | * | 11/1994 | Baird et al. | ........................ | 83/786 |
| 5,987,758 A | * | 11/1999 | McCurry et al. | ........................ | 30/392 |
| 6,112,420 A | * | 9/2000 | Schickerling | ........................ | 30/392 |

FOREIGN PATENT DOCUMENTS

CA 205110 * 10/1920 ................... 30/523

* cited by examiner

Primary Examiner—Kenneth E. Peterson
(74) Attorney, Agent, or Firm—Charles E. Baxley

(57) ABSTRACT

A hacksaw includes a U-shaped frame and a handle connected to a first end of the frame and an engaging port is connected to a second end of the frame. A groove is defined longitudinally in the handle and a passage is defined in the handle. The passage intersects the groove and communicates with the groove. A retaining member is movably received in the passage and a recess defined in the retaining member so that a blade extends through the groove and the recess. The blade is engaged with the engaging port. A cam member is pivotably connected an end of the retaining member such that the retaining member is lifted to secure the blade between an inside of the recess and the inside of the groove by pivoting the cam member. The blade is easily loosened by pivoting the cam member in the other direction.

1 Claim, 3 Drawing Sheets

SAW BLADE SECURING DEVICE

FIELD OF THE INVENTION

The present invention relates to a securing device that has a retaining member with a passage in which a section of the blade is engaged. A cam member is pivotably connected to the retaining member so as to lift the retaining member to secure the blade.

BACKGROUND OF THE INVENTION

A conventional saw especially for a hacksaw generally includes a U-shaped frame with a handle connected to an end of the frame, and a blade is connected to between the two distal ends of the frame. The blade generally has two apertures in two ends thereof and the two ends of the frame have a connection member which has a pin for being engaged with the two respective apertures. One of the two connection members has a threaded rod to which a wing nut is threadedly mounted. The wing nut has to be securely connected to the threaded rod to pull the pin to provide a tension of the blade. When the users want to replace a new blade, the wing nut is unscrewed to remove the two pins from the apertures of the blade, and the new blade is then installed to the two pins and secured by re-screwing the wing nut. This replacement includes many steps and takes a lot of time.

The present invention intends to provide a quick releasing device for securing or disengaging the blade from the frame.

SUMMARY OF THE INVENTION

In accordance with one aspect of the present invention, there is provided a hacksaw which comprises a U-shaped frame and a handle extends from a first end of the frame. A groove is defined longitudinally in the handle and a passage is defined in the handle. The passage intersects the groove and communicates with the groove. An engaging port is connected to a second end of the frame. A retaining member is movably received in the passage and a recess is defined in the retaining member. A blade extends through the groove and the recess, and the blade is engaged with the engaging port. A cam member is pivotably connected an end of the retaining member.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
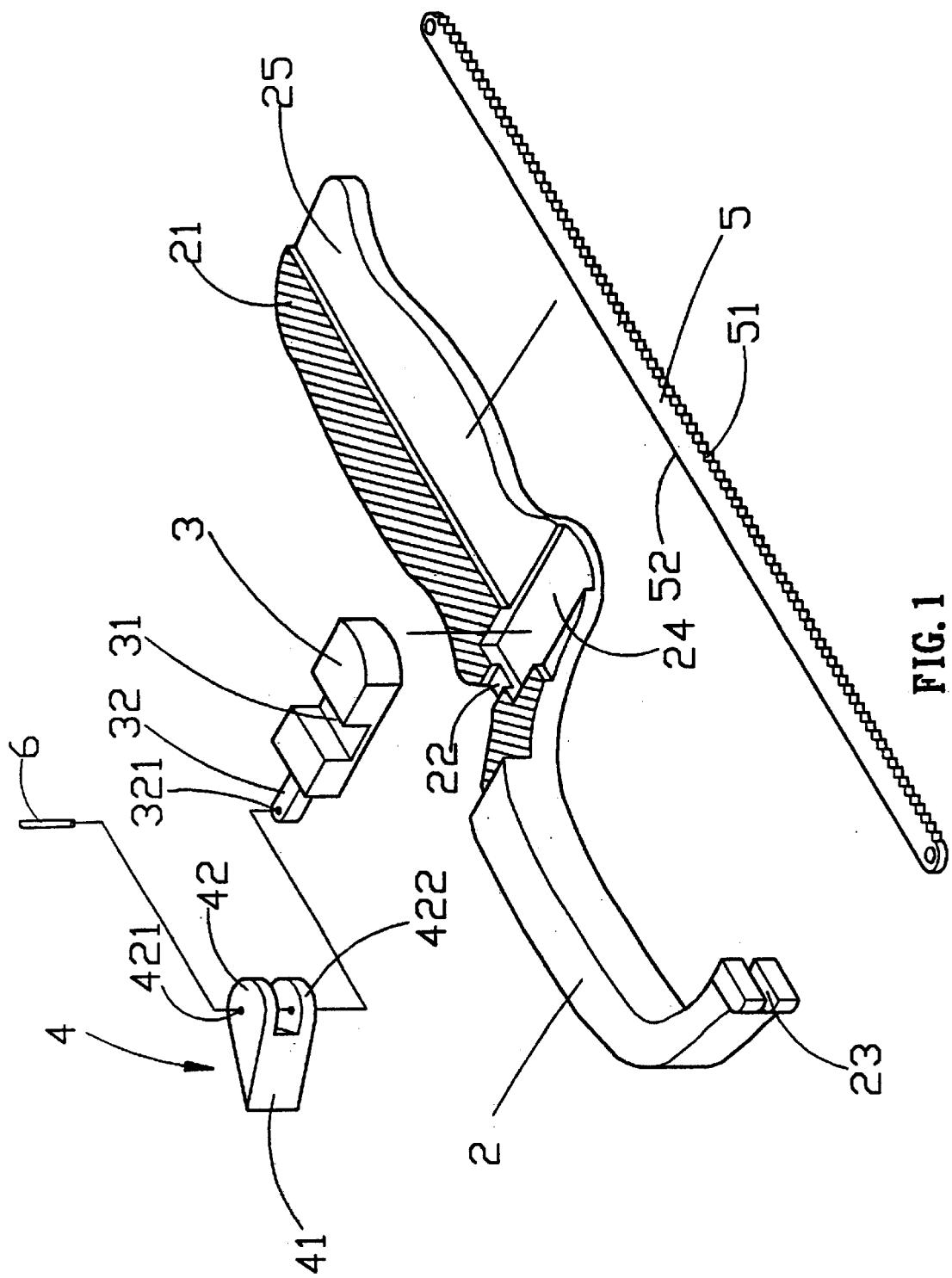
FIG. 1 is an exploded view to show the hacksaw of the present invention.
Figure 2:
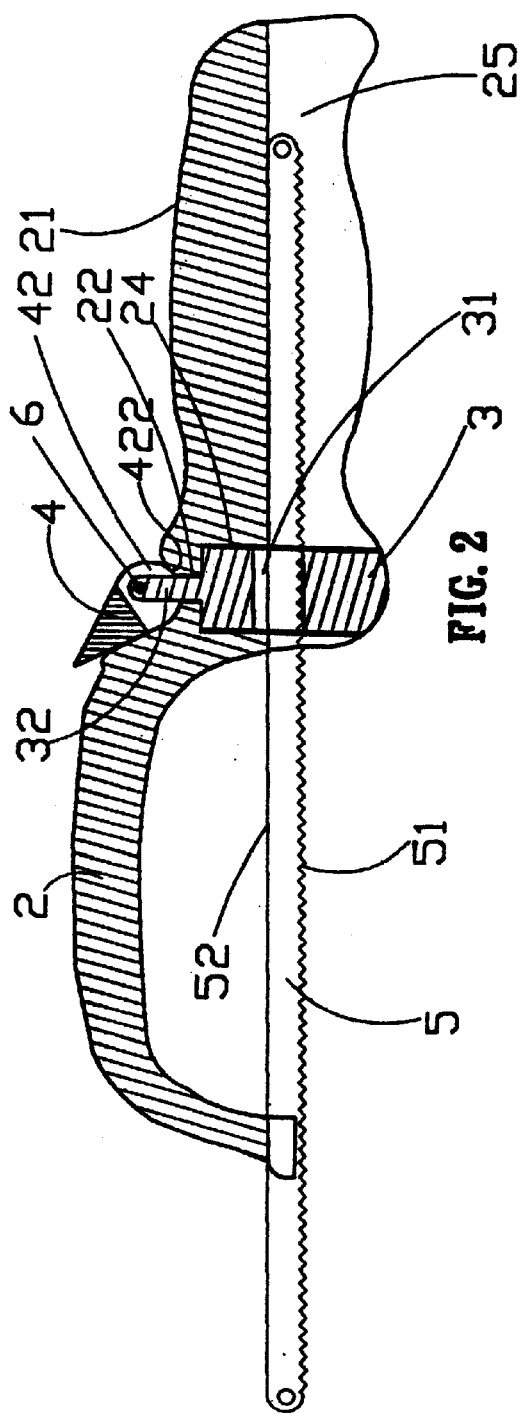
FIG. 2 is a cross sectional view to the blade is secured by the cam member and the retaining member.
Figure 4:
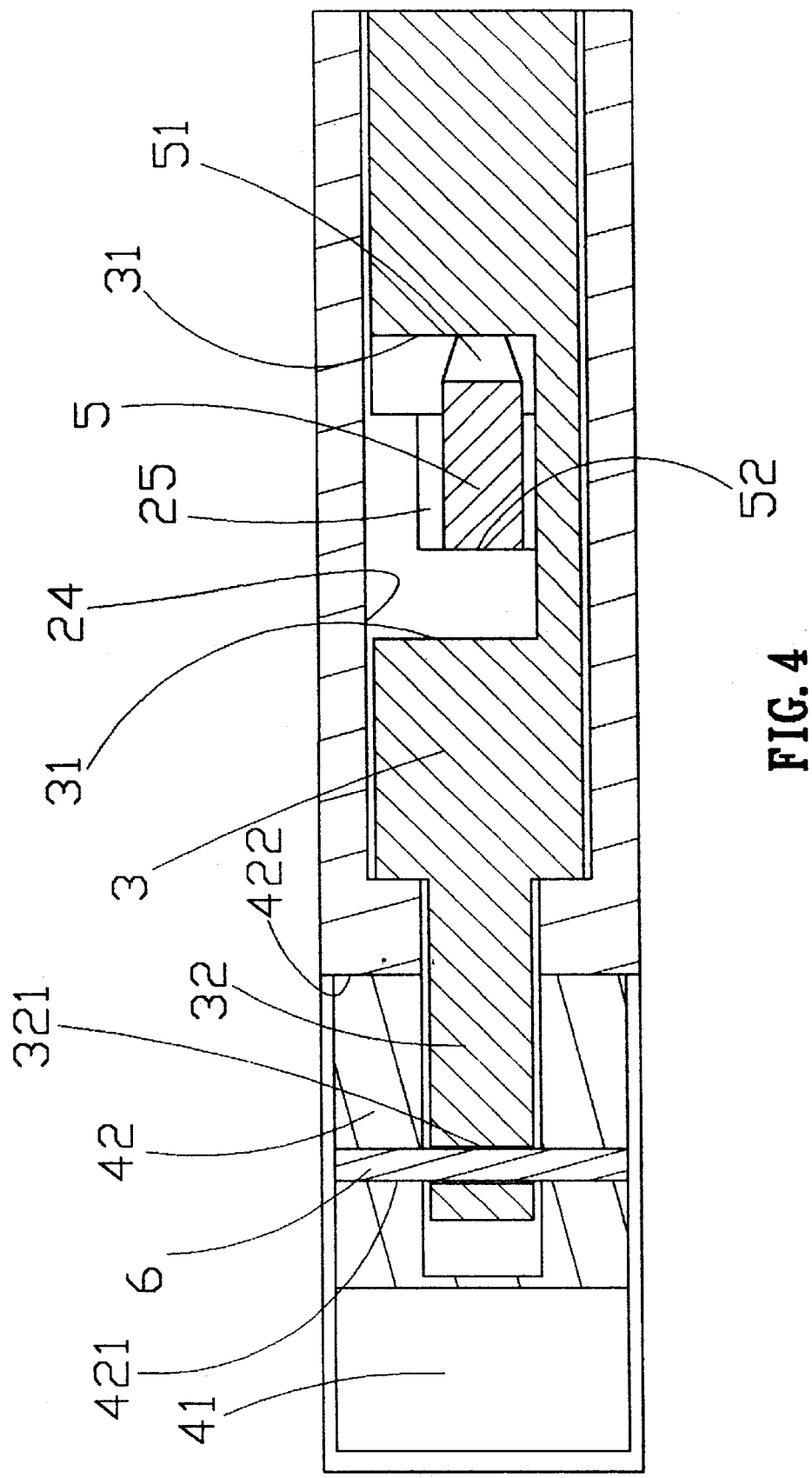
FIG. 4 is a cross sectional view to show the engagement between the cam member, the retaining member and the blade in the groove of the handle of the hacksaw.

Referring to FIGS. 1, 2 and 4, the hacksaw of the present invention comprises a U-shaped frame 2 and a handle 21 extends from a first end of the frame 2. A groove 25 is defined longitudinally in the handle 21 and a passage 24 is defined in the handle 21, wherein the passage 24 intersects the groove 25 and communicates with the groove 25. An engaging port with a slot 23 is connected to a second end of the frame 2. The handle 21 has an opening 22 defined in a top thereof and the opening 22 communicates with the passage 24.

A retaining member 3 is movably received in the passage 24 and a recess 31 is defined in the retaining member 3. A connection protrusion 32 extends from a top end of the retaining member 3 and extends out from the opening 22. A cam member 4 has two lugs 42 and the top end of the retaining member 3 is pivotably received between the two lugs 42 by extending a pin 6 through the holes 421 in the two lugs 42 and the hole 321 in the connection protrusion 32. The two lugs 42 each have a pushing convex 422 and a distance between the holes 421 and the surface of the convex 422 is longer than the distance between the rest area of the lugs 42 to the holes 421. The surfaces of the two lugs 42 are smoothly engaged with a concave portion in the top of the handle 21. A lever portion 41 is formed on the cam member 4 at an opposite end of the lugs 42.

A blade 5 extends through the groove 25 and the recess 31 in the retaining member 3. An end of the blade 5 extends out from the handle 21 and is engaged with the slot 23 in the engaging port.

When the cam member 4 is pivoted to the position as shown in FIG. 2, the pushing convexes 422 the two lugs 42 lift the retaining member 3 upward such that a blade top 52 is secured clamped against the inside of the groove 25 and the teeth portion 51 is engaged with the inside of the recess 31 as shown in FIG. 2.

Figure 3:
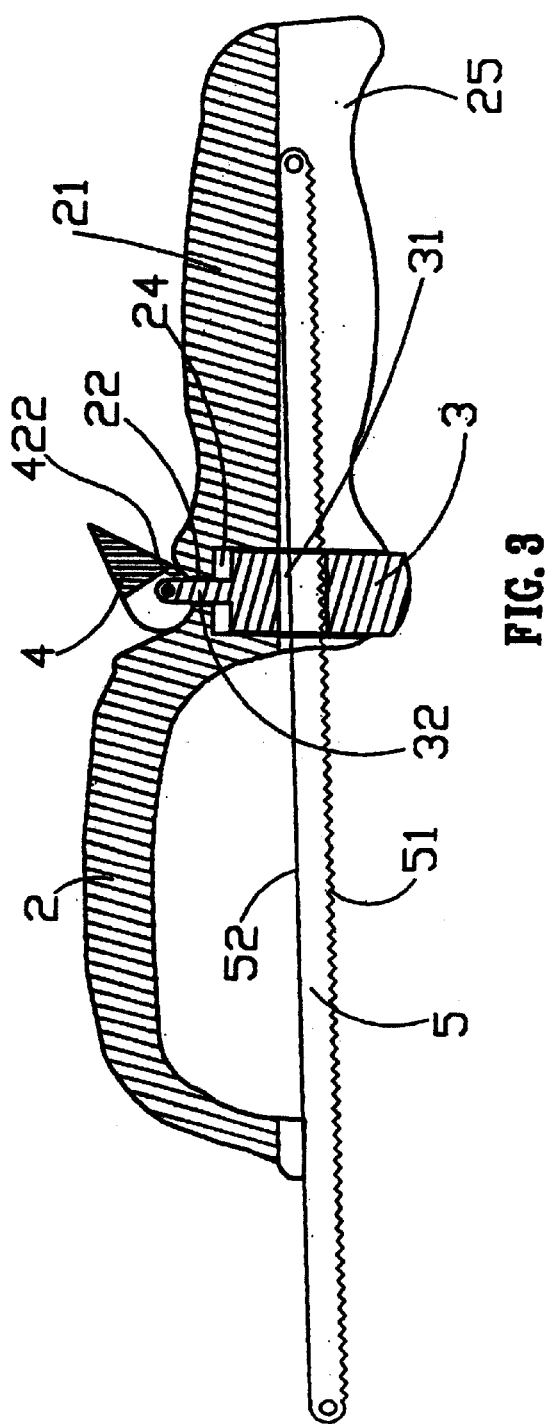
FIG. 3 is a cross sectional view to the blade is loosened by pivoting the cam member.

As shown in FIG. 3, when pivoting the cam member 4 to the other direction as shown, the pushing convexes 422 is pivoted aside and the retaining member 3 is loosened so that the blade 5 is loosened. By pivoting the cam member 3, the blade 5 can be easily secured or loosened with one action. No wing nut or threaded rod is needed to install the blade 5.

While we have shown and described the embodiment in accordance with the present invention, it should be clear to those skilled in the art that further embodiments may be made without departing from the scope of the present invention.

What is claimed is:

1. A hacksaw comprising:

a U-shaped frame and a handle extending from a first end of the frame, a groove defined longitudinally in an underside of the handle and a passage defined in the handle, the passage intersecting the groove and communicating with the groove, an opening defined in a top thereof and the opening communicates with the passage, an engaging port connected to a second end of the frame and having a slot;

a retaining member movably received in the passage and a recess defined in a side of the retaining member, a connection protrusion extending from an end of the retaining member and extending out from the opening, a cam member pivotably connected to the connection protrusion of the retaining member; and a blade extending through the groove and the recess in the retaining member, the blade engaged with the slot in the engaging port, an inside of the recess in the retaining member applied a force to a teeth portion of the blade toward the cam member to position the blade.

* * * * *